United States Patent [19]
Gerloff et al.

[11] 3,833,344
[45] Sept. 3, 1974

[54] FRICTION MATERIAL OF THE SINTERED BRONZE TYPE

[75] Inventors: Günter Gerloff, Glinde near Hamburg; Klaus Mertl; Ulrich Völker, both of Reinbek, all of Germany

[73] Assignee: Jurid Werke GmbH, Glinde near Hamburg, Germany

[22] Filed: Mar. 7, 1972

[21] Appl. No.: 232,503

[30] Foreign Application Priority Data
Apr. 26, 1971  Germany............................ 2120260

[52] U.S. Cl....................... 29/182.5, 29/182, 75/153
[51] Int. Cl................................................. B22f 3/00
[58] Field of Search ............ 29/182, 182.5; 75/201, 75/221, 175.5, 164, 159, 161, 170, 172, 122.7, 154, 153

[56] References Cited
UNITED STATES PATENTS

| | | | |
|---|---|---|---|
| 2,945,292 | 7/1960 | Luther et al. | 29/182.5 |
| 3,067,493 | 12/1962 | Sampson | 29/182.5 |
| 3,101,527 | 8/1963 | Weinman et al. | 29/182.5 |

*Primary Examiner*—Stephen J. Lechert, Jr.
*Attorney, Agent, or Firm*—Young & Thompson

[57] ABSTRACT

A friction material of the sintered bronze type containing, by weight, 4 to 15 percent of at least one element selected from the group consisting of titanium and a metal of Groups VI, VII and VIII of the Periodic System, 5 to 25 percent of a graphite-mixture consisting of 20 to 80 percent of an artificial graphite and the rest comprises a natural graphite, with the balance of the material being a metal compound selected from the group consisting of copper and a known bronze alloy different from a binary lead bronze. The artificial graphite preferably is electrographite, and the natural graphite preferably is lamellar graphite.

5 Claims, No Drawings

FRICTION MATERIAL OF THE SINTERED BRONZE TYPE

SUMMARY OF THE INVENTION

The invention relates to a friction material with a high coefficient of friction, low wear and low corrosion sensitivity.

Friction materials of high friction values and low wear are known, e.g., from the applicant's German Pat. No. 1,533,278. These friction materials are made from sintered iron and, despite their good friction properties, have the disadvantage that they are not free from the likelihood of corrosion, so that their range of uses is limited.

The known friction materials based upon bronzes have low corrosion. In these in order to achieve a satisfactorily high friction value, so-called friction additives are included such as quartz sand, corundum, silicates and other oxides which reduce the liability to wear of the material itself but, as is disadvantageous, lead to counter-attack, that is to abrasion or wear of the counter-material, e.g., of the brake drum or brake pad material which is relatively high on installation of these friction materials in for example vehicles, where normally the counter-material consists of case iron or steel.

The invention is based upon the problem of providing a friction material which under similar installation conditions has good friction properties but no appreciable corrosion.

This problem is solved by the sintered bronze friction material according to the invention, which comprises 4 to 15 percent of titanium and/or one or more metals of Groups VI, VII and/or VIII of the Periodic System, 5 to 25 percent of graphite and 60 to 91 percent of copper or a bronze (with the exception of binary lead bronzes), wherein the graphite consists of 20 to 80 percent artificial graphite and the balance natural graphite. Apart from the nature of the graphite, such compositions are already known, as disclosed in U.S. Pat. application Ser. No. 155,675, filed May 25, 1971.

As has suprisingly been found, it is possible with such sintered bronze friction materials to achieve excellent friction properties which are substantially improved in comparison to those of known bronzes, by combining natural graphite with artificial graphite in the stated proportions.

If the proportion of artificial graphite included in a friction material with otherwise similar properties is less than that of the invention, that is less than 20 percent of the graphite, then the friction value is too low and the material can only be sintered with difficulty. If the proportion of artificial graphite is higher than 80 percent, then unsatisfactory friction properties arise and the phenomenon known as "stick-slip" is given.

Electrographite, particularly hard burned electrographite, has proved particularly suitable as the artificial graphite for the friction materials according to the invention. The natural graphite is preferably lamellar graphite. Both the artificial graphite and the natural graphite desirably have a particle size range of 60 to 800 μm.

Electrographites as is known have relatively high friction values ($\mu > 0.3$) compared with natural graphite ($\mu < 0.16$). The so-called hard burned electrographites, which have a hardness seven to eight times greater than that of normal electrographite, have particularly high friction values and very low wear. It has been found that they are suitable — as a constituent of the friction material according to the invention — in conjunction with natural graphite without causing abrasion of the counter-material, as occurs with known friction materials which contain oxides.

It has been determined that the relative proportions given of the electrographite to the natural graphite, that is an optimum percentage ratio of the electrographite to natural graphite of 53 to 47 percent, is most preferably maintained in order to obtain friction materials according to the invention with a high and constant friction value, low wear and the lowest possible abrasion of counter-materials.

As has surprisingly been found, by the use of a sintered bronze of copper and cobalt in which the addition of the cobalt amounts of 6.25 percent of the copper, it is possible to impart particularly satisfactory friction properties to the sintered bronze friction materials according to the invention. Very good values are obtained with a friction material of the following composition:

| | | | |
|---|---|---|---|
| Copper | 80% ( | Particle size | 5– 80μm) |
| Cobalt | 5% ( | do. | 15– 55μm) |
| Artificial graphite | 8% ( | do. | 100–300μm) |
| Lamellar natural graphite | 7% ( | do. | 100–300μm) |

A friction material according to the invention so formulated exhibits satisfactory values on a test rig, that is low wear and particularly uniform friction values, as compared with those friction materials with bronzes in which a proportion of cobalt, bismuth or tin is present. The applicant has the opinion that this particular improvement of the friction properties is related to the formation of alpha-mixed crystals, as can be formed between cobalt and copper, as is known, at temperatures of about 1,000°C., for at these temperatures cobalt is soluble to about 5 percent as an alpha-mixed crystal in copper. Apparently the alpha-mixed crystals lead to a reduction in the known tendency of copper to suffer so-called hot spot welding under rubbing conditions.

The copper is desirably present in the friction material according to the invention in a particle size range of 5 to 500 μm and most preferably 5 to 80 μm. When cobalt is present, this is advantageously provided in a particle size range of 3 to 200 μm, preferably 15 to 55 μm.

The friction material according to the invention can be worked very simply. It can be prepared by a relatively simpler cold pressing operation. Together with the improved use properties of the friction material according to the invention, it has the additional advantages of a notable saving in weight and a simplified and thus technically less onerous manufacturing technique.

EXAMPLE 1

From the following constituents:

| | | |
|---|---|---|
| Copper powder particle size | 50 μm, | 80 parts by weight |
| Cobalt powder particle size | 30 μm, | 5 parts by weight |
| Hard burned electrographite particle size | 200 μm, | 8 parts by weight |
| Lamellar natural graphite particle size | 250 μm, | 7 parts by weight | a friction material according to the invention was manufactured as follows. The pulverulent constituents were mixed together and pressed cold at a pressure of 2 to 4 Mp/cm². They were then sintered at 600° to 800°C. Finally, they were pressed again at a pressure of 2 to 4 Mp/cm² and then finally sintered at a temperature of 1,100° to 1,200°C.

After sintering, the materials were accurately compressed (sized) to a residual pore volume of less than 10 percent at a pressure of 2 to 4 Mp/cm². The article was then finished. It had a lower weight compared with known sintered bronze friction materials and less wear and a substantial increased resistance to corrosion as compared with known sintered iron materials.

The friction material according to the invention thus made was tested with the usual sintered iron friction materials according to the Dew Point Reversed Environment Test according to DIN 50017-SFW. The test pieces (namely four test pieces of the friction material according to the invention manufactured according to Example 1 and four test pieces of conventional sintered iron friction material) were dried and weighed after each test run and the increase in weight recorded. The values obtained are shown in the following Table.

DIN 50017 (3 Runs)

| Test Piece No. + | Weight before testing | Weight after first run | % increase in weight | Weight after second run | % increase in weight | Weight after third run | % increase in weight |
| --- | --- | --- | --- | --- | --- | --- | --- |
| 1 | 70.80 | 70.95 | 0.21 | 71.05 | 0.35 | 71.09 | 0.41 |
| 2 | 70.38 | 70.51 | 0.18 | 70.60 | 0.31 | 70.62 | 0.36 |
| 3 | 71.78 | 71.91 | 0.18 | 72.01 | 0.32 | 72.05 | 0.38 |
| 4 | 72.50 | 72.65 | 0.21 | 72.72 | 0.30 | 72.75 | 0.35 |
| 10 | 69.40 | 69.45 | 0.07 | 69.49 | 0.13 | 69.50 | 0.14 |
| 11 | 69.45 | 69.49 | 0.05 | 69.52 | 0.10 | 69.52 | 0.10 |
| 12 | 68.70 | 68.73 | 0.04 | 68.76 | 0.09 | 68.77 | 0.10 |
| 13 | 69.76 | 69.80 | 0.06 | 69.88 | 0.17 | 69.89 | 0.19 |

+ Test Pieces Nos. 1, 2, 3 and 4 consisted of conventional sintered iron friction material; Test Pieces Nos. 10, 11, 12 and 13 consisted of a friction material according to the invention manufactured in accordance with the aforementioned example.

The reduced susceptibility to corrosion of the friction material according to the invention as compared with the conventional iron friction material (described in the applicant's German Specification 1,533,278) is clearly demonstrated.

Further test pieces were examined upon a part-surfaced disc brake test rig according to a usual test programme employed in the automobile industry.

Grey cast iron (GG 26) was used as the counter material, (the drum material).

The friction material according to the invention had an average friction value $\mu = 0.46$, a wear loss of 1.7 g and a loss from the counter disc of 0.4 g.

An average friction material based upon bronze which had a friction value $\mu = 0.42$ and the following composition:

Cu     = 74%
    Sn     = 6%
    Pb     = 3%
    Fe     = 5%
    C      = 7%
    Al₂O₃  = 5% was tested according to the same programme and gave the following results:

Loss                        5.6 g
    Wear from the counter disc  6.1 g

Also the counter material of the comparison test piece showed deep grooves which were not present in the test material according to the invention.

We claim:

1. A sintered bronze friction material consisting essentially of copper, cobalt and graphite, in which the cobalt is about 6.25 percent by weight of the copper and the graphite is about 5 to 25 percent by weight of the whole, 20 to 80 percent of the graphite being artificial graphite and the rest of the graphite being natural graphite.

2. A friction material as claimed in claim 1, having the following composition by weight:

Copper              80%
    Cobalt              5%
    Artificial graphite 8%
    Natural graphite    7%.

3. A friction material as claimed in claim 1, in which said artificial graphite is electrographite and said natural graphite is lamellar graphite.

4. A friction material as claimed in claim 1, having the following particle size range:

Copper              5 to 500 μm
    Cobalt              3 to 200 μm
    Artificial graphite 60 to 800 μm
    Natural graphite    60 to 800 μm.

5. A friction material as claimed in claim 1, having the following particle size range:

Copper              5 to 80 μm
    Cobalt              15 to 55 μm
    Artificial graphite 100 to 300 μm
    Natural graphite    100 to 300 μm.

* * * * *